Patented Nov. 16, 1937

2,099,019

UNITED STATES PATENT OFFICE 2,099,019

PIGMENTS AND METHODS OF MAKING SAME

Charles J. Kinzie, Niagara Falls, N. Y., assignor to The Titanium Alloy Manufacturing Company, New York, N. Y., a corporation of Maine No Drawing. Application May 2, 1934, Serial No. 723,504

6 Claims. (Cl. 134—58)

My invention relates to new and improved methods of coating or impregnating pigments that are used for paints with zirconium compounds, and more particularly to certain chalking pigments, such as titanium and zinc pigments, the particles or aggregates of particles of which are advantageously coated or impregnated with zirconium dioxide and/or zirconium silicon complexes to prevent such undesired chalking properties in the resulting pigments.

My invention comprises, among other things, the discovery of improved methods for the manufacture of these pigments, so as to overcome their chalking characteristics by intimately compounding therewith the non-chalking properties of zirconium compounds. I have found it of particular advantage to precipitate a small amount of the non-chalking zirconium compounds that coat, or are intimately associated with, the otherwise chalking pigment either during or subsequent to the preparation of the latter, thereby producing an improved non-chalking pigment.

My invention, therefore consists in coating or impregnating titanium and zinc pigments as well as other chalking pigments with a relatively small amount of a zirconium compound that effectively precludes chalking in the resulting composite pigment without undesirably increasing the cost of such pigments, since zirconium materials in their pure state are more expensive than titanium or zinc pigments.

I have practiced my invention successfully in a number of different ways, and the following examples will show how my novel pigments may be advantageously prepared and produced.

Example A

Titanium calcium pigments or titanium barium pigments or substantially pure titanium dioxide are first prepared by well-known methods, for example, as set forth in U. S. Letters Patent No. 1,205,144 of November 21, 1916; Reissue No. 14,289 of April 24, 1917; No. 1,236,655 of August 14, 1917; No. 1,680,316 of August 14, 1928; and Nos. 1,906,729 and 1,906,730 of May 2, 1933. After washing out of the soluble iron and other impurities from the precipitated titanium compounds, but before calcining, I add a small quantity of a zirconium solution to the wet titanium slurry, or a soluble zirconium salt may be added. Dissolved zirconium salts, such as the sulphate, chloride or nitrate are also suitable. There is now effected a precipitation of the zirconium upon and/or within the titanium particles or aggregates, which may be done according to any of the following optional methods:—

$A$-1.—Phosphoric acid may be added in an amount just sufficient to precipitate the zirconium as the phosphate upon the particles and also the particle aggregates of the titanium pigment.

$A$-2.—When using a zirconium sulphate solution, the charge may be partially neutralized to effect a precipitation of the zirconium as the basic sulphate having a trace of chloride present.

$A$-3.—When using a zirconium sulphate solution, a seeding agent such as potassium sulphate ($K_2SO_4$) may be added, and then by partial neutralization, the zirconium is precipitated as basic potassium zirconium sulphate upon the particles of the titanium pigment and aggregates.

In the above sub-methods ($A$-1, $A$-2 and $A$-3), the zirconium (calculated to oxide) should be relatively small in amount in relation to the base pigment being coated. I prefer to use less than 20% $ZrO_2$ equivalent based on the base pigment being treated, and preferably the amount should be kept below 5% by using just enough to accomplish the non-chalking effect.

In each of the three sub-methods the product is then subjected to washing with water, and then this washed product is calcined to form the pigment material.

Example B

In this example the base titanium pigment particles or aggregates are impregnated or coated or intimately associated with zirconium compounds by adding a readily decomposable zirconium salt or solution of a zirconium compound to the previously precipitated and washed pigment, and the coated or impregnated product is formed by calcination, according to the procedures now set forth:—

$B$-1.—To a quantity of titanium pigment slurry or cake, before calcining, there is added, and therewith intimately mixed crystals of zirconium oxychloride ($ZrOCl_2$), and the mass is then calcined without further treatment.

$B$-2.—Zirconium nitrate may be used to replace the $ZrOCl_2$ of sub-method $B$-1.

$B$-3.—Zirconium oxalate may also be used to replace the $ZrOCl_2$ of sub-method $B$-1.

In each of the above sub-methods described in this Example B, the amount of zirconium salts based on the $ZrO_2$ equivalent may range from ½ of 1% up to 20%, but is preferably kept below 5% of the base pigment being treated.

Example C

In this example the zirconium solution which I have described in Examples A and B is replaced by an acid zirconium solution containing silicon and an alkali metal such as is set forth in my U. S. Patent 1,916,226 of July 4, 1933.

If more concentrated stabilized solutions are required those described in my United States Letters Patent No. 2,017,125 dated October 15, 1935 may be used. Such solutions consist of stabilized acid zirconium solutions containing soluble compounds of silicon and soluble salts of a metal of the group consisting of barium, sodium and potassium, combined with not less than 0.10% of a soluble carbon compound. A barium zirconium silicon chloride solution may also be used, in which case the barium, zirconium and silicon may all be precipitated in the charge leaving a complex

(BaSO$_4$—ZrO$_2$—SiO$_2$)

which forms a coat on the base pigment upon precipitation by partial neutralization, washing and calcination.

Example D

In this example I add to the precipitated and washed base pigment a relatively small amount, preferably below 5%, of alkali zirconium silicon citrate as produced according to the methods described in my United States Letters Patent No. 2,013,857 dated September 10, 1935. Such citrate is characterized as being a water-soluble, nearly transparent, gum-like salt obtained from a dried solution of an alkali-metal zirconium silicate in citric acid, and consists of a citrate complex of zirconium, silicon and alkali-metal with traces of iron and titanium, and having approximately the following composition:

|  | Per cent |
| --- | --- |
| Silicon (calculated as SiO$_2$) | 10.61 |
| Zirconium (calculated as ZrO$_2$) | 20.74 |
| Titanium (calculated as TiO$_2$) | 0.04 |
| Iron (calculated as Fe$_2$O$_3$) | 0.02 |
| Carbon (C) | 21.39 |
| Sodium (calculated as Na$_2$O) | 15.51 |
| Water | 31.69 |
|  | 100.00 |

The above composition would naturally vary depending upon the temperature and time of drying, but the above analysis represents a composition that may be readily obtained by the use of known drying equipment. The product is a nearly transparent gum-like substance which is completely and readily soluble in water.

Upon calcination the sulphuric anhydride vapors liberated from the basic titanium sulphates decompose the organic matter in the citrate and combine with the alkali (sodium) to form Na$_2$SO$_4$ so as to leave a residue of zirconium dioxide and silica, or a combination thereof, on the base pigment. Any remaining alkali-metal sulphate may then be washed out of the calcined product.

In place of the citrate just described, I have also used a relatively small amount, preferably below 5%, of an alkali-metal zirconium tartrate such as is produced according to the methods described in my United States Letters Patent No. 2,013,856 dated September 10, 1935. Such tartrate is characterized as being a non-crystalline, transparent, readily water-soluble material consisting of an aqueous complex of an alkali-metal (sodium), zirconium, ammonium tartrate that contains less than 0.05% each of titanium dioxide and ferric oxide, and has approximately the following composition:

| Silicon (calculated as SiO$_2$) | Trace |
| --- | --- |
| Zirconium (calculated as ZrO$_2$) | 9.10% |
| Titanium (calculated as TiO$_2$) | 0.02% |
| Iron (calculated as Fe$_2$O$_3$) | 0.01% |
| Carbon (C) | 9.71% |
| Sodium (calculated as Na$_2$O) | 7.07% |
| Water and ammonium compounds | 74.09% |
|  | 100.00% |

Upon calcination in the case of the tartrate, the fumes decompose this complex, and combine to break up the alkali (sodium) zirconium combination to form Na$_2$SO$_4$, ZrO$_2$ etc. The Na$_2$SO$_4$ can then be washed out of the calcined product. In either case the residue, when dried, consists of a base titanium pigment intimately associated with zirconium oxide.

Example E

This example sets forth various sub-methods in which there is a prior calcination of the base pigment, followed by the deposition thereon of a zirconium or zirconium silicon solution complex, and the resulting composite that is formed is then subjected to calcination.

*E–1.*—Calcined titanium pigments such as described in Example A are treated with a small amount of ZrOCl$_2$ or zirconium nitrate solution, and then gently calcined at temperatures of 500–900° C., preferably about 700° C. to leave a deposit of zirconium dioxide upon the base pigment.

*E–2.*—Calcined titanium pigments are treated with a solution of zirconium silicon chlorides such as may be prepared as described in my application for patent filed July 29, 1933 Serial No. 682,795 in which 1.38 parts of silicon tetrachloride (SiCl$_4$) and
2.00 parts of zirconium tetrachloride (ZrCl$_4$)

are dissolved in about 5 parts of water to form the mixed zirconium silicon chloride solution which is then used for treating the calcined titanium pigments.

Upon calcination as in sub-method E–1 a complex of ZrO$_2$—SiO$_2$ in proportions substantially the same as those present in ZrSiO$_4$ is left as a coating on the base pigment particles.

*E–3.*—Calcined titanium pigments are treated with a solution of an alkali or alkaline earth metal zirconium-silicon chloride as in sub-method E–2. This chloride solution contains zirconium chloride, alkali metal, such as sodium, or alkali earth metal, such as barium, chlorides and silicon as hydrate compounds in solution or possibly a colloidal solution. Upon heating this solution ZrO$_2$ and SiO$_2$ are formed (ZrO$_2$—SiO$_2$ complex) in proportions substantially as present in ZrSiO$_4$, while the sodium chloride or barium chloride remain as such and are water soluble. These chlorides may then be extracted by washing if found to be in an amount detrimental to the pigment.

*E–4.*—Barium zirconium-silicon chlorides, such as are formed as described in my United States Letters Patent No. 2,017,125 dated October 15, 1935, may be used to coat the base pigment. This chloride may be produced as follows:

500 parts by weight of finely milled zircon ($ZrSiO_4$) were intimately mixed with 527½ parts by weight of barium carbonate and the charge was heated to a temperature of about 1200–1300° C. which heat treatment resulted in the essentially complete decomposition of the zirconium silicate so as to form a barium zirconium silicate which is soluble in dilute acids. The roasted product is unfused and relatively soft after heating and is of the following approximate composition.

|  | Per cent |
|---|---|
| Zirconium (calculated as $ZrO_2$) | 35.71 |
| Silicon (calculated as $SiO_2$) | 18.68 |
| Barium (calculated as BaO) | 45.05 |
|  | 99.44 |

The balance consists of impurities such as $Al_2O_3$, $TiO_2$, $Fe_2O_3$, etc. Then 200 parts by weight of the above product were wet-milled with 100 parts by weight of water to such fineness that substantially all will pass a 325 mesh sieve. Since the product is soft the milling is readily effected. Before discharging the mass from the mill 100 parts by weight of water were added to form a slurry or suspension of water insoluble barium zirconium silicate.

In obtaining this solution the following will illustrate the method as well as a comparison between the untreated solution and that which is treated according to my invention in respect to the stabilizing effect of any organic matter.

(1) 63.0 parts by weight of hydrochloric acid of 35.5% HCl content, are diluted with 40 parts by weight of water and the mix is then heated to 95° C.; 100 parts by weight of barium zirconium silicate suspension are then added to the solution which is nearly complete in a few minutes. Then 64 parts by weight of water are added. This charge was digested at about 95° C. and after 20 minutes the solution had set to a solid gel.

(2) 63.0 parts by weight of hydrochloric acid of 35.5% HCl content are diluted with 40 parts by weight of water and heated to 95° C.; 100 parts by weight of barium zirconium silicate suspension are stirred in and the solution is nearly completed shortly thereafter. There was now added 1 part by weight of tartaric acid in solution to 63 parts by weight of water.

The chlorine solution of this treated example will have approximately the following composition:

|  | Per cent |
|---|---|
| Zirconium (calculated as $ZrO_2$) | 6.0 |
| Silicon (calculated as $SiO_2$) | 3.0 |
| Barium (calculated as BaO) | 8.0 |
| Chlorides (calculated as HCl) | 8.4 |
| Carbon (C) | 0.12 |
| Water ($H_2O$) | 74.48 |
|  | 100.00 |

This resultant solution was digested 1 hour at 95° C. and remained quite fluid; after cooling at room temperature it continued to remain fluid.

A quantity of $H_2SO_4$ was then added in an amount just sufficient to combine with the barium to form $BaSO_4$, and the solution was added to the base pigment and then heated to form a residual coating on the base pigment, which coating consisted of a $BaSO_4$ + a $ZrO_2$—$SiO_2$ complex, the $ZrO_2$ and $SiO_2$ being substantially in the same proportions as in $ZrSiO_4$.

E–5.—Calcined titanium base pigments were treated with an alkali-metal zirconium silicon citrate as described in Example D, and then calcined to leave a residual coating of an alkali metal zirconium silicate on the base pigments. Such citrate solution may be made as follows:

The first step consists in decomposing finely-milled zirconium silicate by heating same with an alkali, sodium carbonate for example, at temperatures of about 900–950° C. to yield a product readily soluble in dilute acids. Other alkalis such as sodium hydroxide, sodium peroxide and sodium sulphide, or mixtures thereof, may be used; also potassium compounds such as potassium carbonate.

This roasted product consisting of sodium zirconium silicate is preferably milled with water to a very fine state. The following example will illustrate the procedure I prefer to use:

100 parts by weight of sodium zirconium silicate and
96 parts by weight of water are wet milled in a suitable ball mill until less than ½ of 1% remains on a 325 mesh sieve when a sample is tested for fineness.

The mill is discharged, and the slurry thus obtained which consists mainly of sodium zirconium silicate in water suspension will have a composition approximately as follows:—

|  | Per cent |
|---|---|
| Zirconium (calculated as $ZrO_2$) | 20.65 |
| Silicon (calculated as $SiO_2$) | 10.49 |
| Sodium (calculated as $Na_2O$) | 14.06 |
| Water, etc | 54.80 |
|  | 100.00 |

The zirconium slurry is then washed by suitable means to remove water soluble matter and the insoluble product upon drying had the following composition by analysis:—

|  | Per cent |
|---|---|
| Zirconium (calculated as $ZrO_2$) | 52.42 |
| Silicon (calculated as $SiO_2$) | 25.08 |
| Sodium (calculated as $Na_2O$) | 21.75 |
|  | 99.25 |

110 parts by weight of citric acid are dissolved in 208 parts by weight of water by heating to about 95° C.
100 parts by weight of this dry sodium zirconium silicate are now stirred in and digested while stirring until the zirconium, silicon and alkali are in solution leaving only a small amount of residual matter which in this example was allowed to settle. An essentially clear solution was then decanted from the settled insoluble residue.

Upon analysis this clear solution was found to be of approximately the following composition:—

|  | Per cent |
|---|---|
| Zirconium (calculated as $ZrO_2$) | 12.31 |
| Silicon (calculated as $SiO_2$) | 5.90 |
| Sodium (calculated as $Na_2O$) | 5.58 |
| Carbon (C) | 9.50 |
| Water ($H_2O$) | 66.71 |
|  | 100.00 |

E–6.—Calcined titanium base pigments are treated with a relatively small amount of the alkali metal zirconium tartrates, such as have been hereinbefore described in Example D, or alkali metal zirconium oxalates, and then the mass was calcined to leave a residue of alkali metal zirconate as a coating on the pigment particles or aggregates.

*E-7.*—Calcined titanium pigments are first wetted with a solution of zirconium sulphate, zirconium nitrate, zirconium chloride or zirconium oxalate, and then are treated with phosphoric acid or a phosphate to precipitate the zirconium as zirconium phosphate. The composite zirconium phosphate-titanium pigment is then calcined to eliminate the acid radical.

*E-8.*—Calcined titanium pigments are first treated with a mineral acid zirconium solution as in sub-method E-7, then phosphoric acid or a phosphate is added to precipitate the zirconium on the base pigment, as zirconium phosphate. The mass is then simply washed with water to remove the residual acid formed, and the pigment is obtained by drying at low temperatures of about 110° C.

*E-9.*—Calcined titanium pigments are treated with a small amount of a mineral acid zirconium solution as in sub-method E-7, and the zirconium coating is formed by precipitating the zirconium as hydroxide by the addition of an alkali, followed by suitable washing and drying and also by the added step of calcination, if desired.

*E-10.*—A mineral acid (chloride) solution of zirconium and silicon, or zirconium and silicon with an alkali-metal is added to the hereinbefore described calcined titanium pigments, and the mass is treated with phosphoric acid or a phosphate by which the zirconium is precipitated as a phosphate. This treatment is followed by partial or complete neutralization to precipitate silicon compounds, and then by washing and drying, or if desired by calcination. If calcined, the end product residue is silicon dioxide; if simply dried, such residue is hydrated silica.

In sub-methods E-7 to E-10 inclusive, the calcining temperatures range from 500° to 900° C. with lower temperatures for the chlorides and nitrates, but with higher temperatures for the sulphates.

*E-11.*—An alkali, such as ammonia, may be used alone in sub-method E-10 to coat the base pigment with a zirconium-silicon complex.

Example F

In this example I can prepare a titanium pigment containing small amounts of zirconium compounds by adding a zirconium solution, such as zirconium sulphate, to the titanium solution formed as described in the patents mentioned in Example A prior to precipitation; thereafter I precipitate in the usual manner; I then add a small amount of phosphoric acid to precipitate the zirconium as phosphate. The composite precipitate is then washed and calcined.

Example G

In this example I effect the precipitation of titanium dioxide in the usual manner in a solution containing zirconium sulphate, and then the condition of acidity of the solution is adjusted to allow the zirconium to separate as basic zirconium sulphate. The composite precipitate is then washed and calcined.

Example H

Zinc pigments, particularly zinc sulphide pigments, either pure zinc sulphide or composite pigments, such as zinc sulphide with bases such as $BaSO_4$, etc., may be coated by any one or more of the various zirconium procedures referred to in the preceding examples for forming zirconium compounds, and are then calcined out of contact with oxygen. While hot the charge is discharged into water, milled, extracted with water if need be and dried. In these zinc pigments the amount of zirconium solution should be controlled so as not to dissolve or alter the zinc pigment to any great extent.

Example I

A zirconium solution such as zirconium sulphate is added to the zinc sulphate solution before adding barium sulphide which method produces a composite—$ZnS$—$BaSO_4$—$ZrO_2$ pigment  upon calcining in the absence of oxygen.

Example J

After the composite precipitation of $$ZnS + BaSO_4$$

to form lithopone according to known methods, a small amount of zirconium solution is added to the batch and I then add thereto just sufficient alkali ($NH_4OH$) to precipitate the zirconium as gelatinous zirconium hydroxide on the lithopone pigment, which is then calcined in the usual manner so that the zirconium hydroxide upon calcination yields a residue of zirconium dioxide.

I claim as my invention:—

1. In the method of making a pigment containing zirconium, the step which consists in precipitating a zirconium compound from an acid zirconium solution containing silicon and an alkali-metal on the particles and within the particle aggregates of a base pigment.

2. The method of making a pigment containing zirconium which comprises mixing an alkali-metal zirconium silicon citrate with a precipitated base pigment, and calcining the mixture to produce a composite pigment containing zirconium oxide, silica and the base pigment.

3. The method of making a pigment containing zirconium which comprises mixing a calcined base pigment with a solution of an alkali-metal zirconium silicon organic acid compound to coat the particles and impregnate aggregates of said pigment with an alkali-metal zirconium silicate, and then calcining to form a composite pigment.

4. A pigment comprising a base pigment coated and impregnated with a thereto adhering alkali-metal zirconium silicate.

5. A calcined composite pigment comprising a base pigment coalesced with an alkali-metal zirconium silicate.

6. In the method of making a pigment containing zirconium, the step which consists in adding to a base pigment a solution of zirconium containing acid-soluble compounds of silicon and soluble salts of a metal in the group consisting of barium, sodium and potassium, and also containing a readily water-soluble organic compound selected from the group consisting of tartaric acid, citric acid and sodium zirconium tartrate, and effecting a precipitation therefrom of the zirconium and silicon compounds on the particles of the base pigment.

CHARLES J. KINZIE.